3,172,867
MICROCELLULAR SPHERES OF UNCURED METHYLOLAMINE RESINS AND METHOD OF PREPARATION
William E. Showalter, Seal Beach, Calif., assignor to Union Oil Company of California, Los Angeles, Calif., a corporation of California
No Drawing. Filed Aug. 21, 1961, Ser. No. 132,568
9 Claims. (Cl. 260—2.5)

This invention relates to cellular plastic compositions comprising small plastic balloons and spheres and to the method of their preparation.

Recent advancements in plastics have developed uses for various small cellular plastic spheres such as polystyrene microballoons and microscopic spheres from urea-formaldehyde resins. Heretofore, these materials have been prepared by special spray drying techniques which are often costly, requiring a sizable heat input to remove the liquid dispersing phase, e.g., water. The balloons so produced are generally microscopic in size. Additionally, post treatment of the spray dried material is frequency needed to improve the water resistance of the spheres or balloons.

I have discovered that small cellular plastic balloons can be prepared by admixing a powdered foaming resin composition with a powdered solid media and thereafter heating the mass. The solid media apparently serves as a dispersing media for the powdered resin, preventing contact and sintering of the plastic spheres. Additionally, the spheres so produced have a surface coating of the powdered solid which prevents their sintering and agglomeration and imparts the dispersing solids' properties to the balloons and spheres.

The small spheres so produced are hollow and well suited for use as insulation media or as fillers and extenders for plastics. Syntatic forms can also be produced by bonding the spheres into a solid foam mass with a suitable binder such as an epoxy or polyester resin. In one embodiment, the products can be employed as low density ion exchange solids.

Suitable resin compositions for use in my invention are solid in their uncured state at ambient temperature so as to permit powdering or grinding to the desired fineness. To obtain hollow or foamed spheres a vapor release agent must be in the composition, preferably a resin is employed in which a gas, e.g., water vapor, formaldehyde, carbon oxides, etc., is released during the heat setting of the resin.

The preferred resin compositions are various methylolamine resins which upon curing form polyamido resins. Examples of such prepolymer methylol-amine resins are: monomethylol and dimethylol urea; alkyl methylol ureas, e.g., N-ethyl N'methylol urea, N-butyl N'methylol urea, etc.; alkylated methylol ureas obtained by acid condensation of an alkanol with methylol urea such as butylated or isopropylated methylol urea; mono-methylol and di-methylol ethylene ureas; mono, di and trimethylol melamines; methylol guanamine and methylol diguanamines. Of the foregoing, I prefer the methylol-melamine resins as their curing is readily achieved by heating. Such resins are commercially available or can be prepared in the following manner: Melamine is added to formaldehyde at a mol ratio of about 1/3 to 1/10 (melamine/formaldehyde) and any excess or unreacted formaldehyde is distilled off. The crude resin is a syrupy liquid which is dried to a solid at ambient or slightly elevated temperatures (about 50° to about 200° F.) and the solid thereafter crushed and screened to produce the desired powder.

The solid resin can be ground or powdered to a desired degree of fineness by any suitable method apparent to those skilled in the art, e.g., in an attrition mill, ball mill, etc. In general, the resin is powdered to a fineness passing through about an 8 mesh and retained on a 200 mesh screen. Use of coarser or finer solids than this range will not yield balloons, but rather, foamed solid particles. The average particle diameter corresponding to the aforementioned mesh spacing is about 0.003 to about 0.093 inch. The size range of resin powder used is determined by the size range of balloons or spheres desired. In general, the resin particles when treated in accordance with my invention form balloons and spheres having diameters greater than their initial diameters; between about 0.003 and 0.3 inch.

In some instances, the resins are available commercially as very fine powders which pass a 200 mesh screen. To employ these powders, my invention comprises consolidating the powder by dissolving it in a suitable solvent, e.g., water, acetone, etc., and then evaporating the solvent to yield a dried solid which can be crushed to yield powder which is retained on a 200 mesh screen.

After the resin solid has been ground and screened to the desired size range it is admixed with a powdered solid media in an amount constituting between about 5 and 85 weight percent of the mixture, preferably in an amount between about 25 and 60 weight percent.

The solid media is also powdered for ease of handling and to facilitate separation of the plastic spheres. In general, the solid media can be of a size range passing through about a 3 mesh screen (0.263 inch). Preferably the solid employed has a greater degree of fineness than the resin, e.g., a size range passing through a 200 mesh is well suited for use. The plastic balloons and spheres can thus be easily separated from the bulk of the solid media by a simple screening step.

Various solid media can be used. Clays, such as the various kaolinites and montmorillonites can be used in their naturally occurring state. The clays can also be acidulated or ion-exchanged to replace the naturally adsorbed clay cations, e.g., sodium, calcium, etc., with hydrogen, ammonium, etc.

Organic surfaced clays, i.e., organoclays, can also be used such as various alkyl amine-clay adducts, e.g., oleyl ammonium montmorillonite, octadecyl ammonium montmorillonite, lauryl ammonium kaolin, etc. Other organic moieties can be employed, e.g., melamine surfaced or alkylene diamine, e.g., hexamethylene diamine, surfaced clay wherein the appendant amino groups present functional linkage sites to the methylol amine resin, thereby improving the surfacing of these plastic spheres. Various other organic surfacing agents can be employed such as a polyvinyl alcohol-clay adduct, pyridine-clay, aminophenol clay, etc.

The preparation of the aforedescribed organoclays is well known in the art and hence is not described in detail. In general, the clay in its natural state is dispersed in an aqueous media and base exchanged with an organic ammonium salt, e.g., octadecyl ammonium chloride, pyridine ammonium chloride, etc. In still another mode of preparation, the aforementioned acidulated or ion exchanged clays are neutralized by the organic amino compound, e.g., by the addition of hexamethylene diamine, oleylamine, etc., to an aqueous dispersion of hydrogen montmorillonite to raise its pH from about 2 to between about 5 and 7 units. It has been observed that polyvinyl-alcohol forms a strongly adsorbed adduct with clays such as kaolins and montmorillonites and such organoclay adducts are also useful as the dispersing solid media.

The hydrogen clay, wherein the naturally occurring cations, sodium, calcium, etc., are replaced with hydrogen by acidulation, ion exchange, etc., is particularly useful when methylol urea resins are used to form the plastic spheres since the low pH of the hydrogen clay facilitates the curing of these urea resins.

Other powdered solids can, of course, be employed such as silica, alumina, estersils, carbon, graphite, starch, titania, calcium oxide, plaster of Paris, tricalcium phosphate, etc.

The powdered resin and solid dispersing media are intimately mixed in the aforedescribed proportions; 1:1 weight ratios being preferred; by any suitable means such as double cone mixers, tumbling barrels, helical ribbon mixers, etc. Thereafter the admixed powders are heated to between about 250° and about 600° Fahrenheit for a period of time sufficient to complete polymerization of the resin, generally between about 0.1 and about 2 hours. In general, the upper limit to the cure temperature is limited by the decomposition temperature of the particular resin. The period of time and minimum cure temperature will vary considerably depending on the identity of the resin and the presence or absence of catalysts for the polymerization. Acid releasing agents such as sodium sulfite or benzoyl mercaptobenzothiozole, etc., can be incorporated into the various urea resins, so as to release an acid upon heating and thereby catalyze the polymerization.

Various means well known in the art can be employed to heat the admixed solids, e.g., the solids can be heated batchwise in an electrically heated or fired oven. Continuous processing of the solids is possible by conveying the solids through a heated zone, e.g., beneath infrared strip heaters. The admixed solids are preferably heated in the form of a quiescent bed, either in flat pans, on trays or on a slowly moving conveyor belt. The necessary residence time of the solids within the heating zone is a function of the heat transfer rates, resin activity, bed thickness, etc., in the manner apparent to those skilled in the art. In general, I prefer to deposit the solids in a bed about ¼ to 1½ inches in thickness, on a conveyor belt which slowly moves through a heated zone.

After the resin has foamed into the spheres and hardened, the solid dispersing media is separated by suitable means. Size separation by mechanical screening, elutriation, etc., can be employed when the solid dispersing media is of a different size range than the resin or spheres. As previously mentioned, I prefer to employ a more finely divided solid, e.g., that passing through a 200 mesh screen as the dispersing media so that the spheres can be readily separated therefrom by screening.

Various other separation means can, of course, be used. Flotation or density separation is suitable when the plastic spheres have a density substantially different from the dispersing solid. If desired, a flotation step can be used with various surface active agents so as to remove any occluded or adsorbed solid from the surface of the plastic spheres. This technique is well suited for recovering spheres to be employed for syntactic foams where the spheres' surfaces are to be wetted by a resin binder.

Frequently, it is desired to retain the adsorbed solid on the plastic balloon surface. The adsorbed solid imparts its properties to the balloons, such as color, wettability, etc. Thus, black balloons can be produced by use of powdered carbon black as the dispersing solid, or by use of polyvinyl alcohol-montmorillonite which has been heated to above about 350° F. Purple balloons are achieved by use of a para-aminophenol-montmorillonite solid. Various other properties, e.g., water repellency, can be imparted by use of the aforedescribed organoclays as dispersing solids. Water wettability can also be imparted by use of highly polar solids for the dispersing solid such as sodium chloride, calcium oxide, etc.

Ion exchange properties can be imparted to the balloon surfaces by using a powdered ion exchange solid as the dispersing solid. Thus, powdered hydrogen montmorillonite; sulfonated polystyrene such as Amberlite, Permutit, etc.; alumino silicate gels such as Decalso; sulfonated phenolic resins such as Lewatit, Wofatit, etc., can be employed as the dispersing solids to yield a very low density ion exchange solid. The selection of any ion exchange solid is governed, of course, by the need for one being thermally stable at the minimum cure temperature of the powdered resin and, accordingly, alumino-silicates, molecular sieves, zeolites, hydrogen clays, etc., are the preferred materials. Molecular sieves, i.e., partially dehydrated crystalline zeolitic metalo alumino-silicates known in the art to have crystal types A, X and Y with relatively uniform pore diameters between about 4–15 A. are particularly useful. Such sieves are commercially available from Linde Company, Tonawanda, New York, and described in British Patent 477,233.

The following example will illustrate my invention:

A commercially available formaldehyde-melamine uncured finely powdered resin, "Cymal 405" was dissolved in water, then dried to form a consolidated mass which was ground to a fine powder, screened to obtain a portion passing through a 20 mesh, but held upon a 48 mesh Tyler standard screen. This portion was admixed with a melamine surfaced montmorillonite organoclay. The organoclay dispersing agent was prepared by replacing the sodium cations with hydrogen by ion exchanging an aqueous dispersion of the finely divided clay. The aqueous dispersion of hydrogen clay was thereafter neutralized to a pH of 6.0 by the addition of melamine. The resultant melamine-montmorillonite suspension was spray-dried to obtain an organoclay powder passing a 350 mesh screen.

The powder "Cymal" resin and organoclay were admixed in 1:1 weight ratios and distributed in a ⅜-inch thick layer on a belt conveyor. The conveyor carried the solids beneath infrared strip heaters to expose the solids to a temperature of about 350° F. for 20 minutes. The heated solids were then discharged into a hopper and were screened to separate the spheres from the organoclay solids which were recycled. The spheres were hollow and the fraction thereof having size range passing an 8 mesh Tyler screen but retained by a 20 mesh screen constituted about ⅓ of the product and had a bulk density of 12.5 pounds per cubic foot. The remaining fraction passed a 20 mesh but was retained on a 48 mesh screen and had a bulk density of 30 pounds per cubic foot and a compression (load bearing) strength greater than 150 pounds per square inch.

Microscopic studies showed hollow spherically shaped solids having a surface covered with clay particles. The clay adhering to these solids constituted about 10 weight percent of the spheres.

When the preceding was repeated with powdered resin passing a 48 mesh but retained by a 100 mesh Tyler screen, the hollow spheres passing a 20 mesh and retained on a 48 mesh screen had a bulk density of 25.6 pounds per cubic foot. The spheres passing a 48 mesh and retained on a 100 mesh Tyler screen had a bulk density of 34.2 pounds per cubic foot.

The preceding was repeated, however, a powdered hydrogen montmorillonite was substituted for the melamine montmorillonite organoclay. The resultant balloon products had an ion exchange capacity of 0.5 milliequivalent per 100 grams. When benzidene was added to the balloons, a blue-green color was achieved, characteristic of the benzidene-clay complex.

The preceding exemplified description of my invention is intended solely to illustrate a mode of operation and is not to be construed as unduly limiting of my invention which comprises the steps and obvious equivalents set forth by the following claims.

I claim:

1. The preparation of plastic balloons having diameters between about 0.003 and 0.03 inch which comprises:
   (1) admixing an uncured methylolamine resin in powdered solid form passing an 8 but retained on a 200 mesh screen, said resin being characterized by the release of a gas upon heating and being selected from the class consisting of urea-formaldehyde, melamine-formaldehyde and guanamine-formaldehyde solid resins with a dispersing powdered solid that passes a 3 mesh screen and that is inert to the heating conditions herein set forth in step (2), the amount of said resin comprising from about 25 to 60 weight percent of the admixture of said resin and said powdered solid so that said powdered solid threby prevents contact between the individual powders of said resin;

(2) heating said admixture of solids to a temperature between about 250° and about 600° F. under heating conditions sufficient to completely cure said resin but insufficient to agglomerate and sinter said resin particles to thereby form discrete, non-sintered plastic balloons dispersed throughout said inert powdered solid; and (3) thereafter separating said plastic balloons from said inert solid powder.

2. The preparation of claim 1 wherein said dispersing powdered solid comprises a powdered clay.

3. The preparation of claim 1 wherein said dispersing powdered solid is a molecular sieve that comprises a partially dehydrated crystalline zeolitic metal aluminosilicate having a uniform pore diameter.

4. The method of claim 1 wherein said resin is the reaction product of melamine and formaldehyde.

5. The method of claim 1 wherein said powdered solid resin has a size passing an 8 mesh Tyler screen.

6. The method of claim 1 wherein said dispersing powdered solid has a size passing a 200 mesh Tyler screen.

7. The method of preparing plastic balloons having a size between about 0.003 and 0.3 inch which comprises (1) grinding a prepolymer solid to form a prepolymer powder, said prepolymer solid having been prepared by reacting melamine with formaldehyde at a mol ratio of melamine to formaldehyde between about 1/3 and about 1/10, evaporating off unreacted formaldehyde to form a prepolymer residue and drying said residue to form said prepolymer solid, said grinding of said solid being sufficient to form a prepolymer powder having particle diameters between about 0.003 and 0.093 inch, (2) intimately admixing said prepolymer powder with a finely divided stable dispersing solid in an amount of said resin constituting between about 5 and 85 percent of the mixture, (3) heating said mixture to a temperature between about 250 and 600° F. for about 0.1 to about 2 hours under conditions to cure said prepolymer powder and form said plastic balloons and (4) separating said balloons as non-agglomerated and non-sintered discrete particles dispersed through said finely divided stable dispersing solid from said dispersing solid.

8. The method of claim 1 wherein said powdered solid is an aluminum silicate.

9. The method of claim 8 wherein said aluminum silicate has an ion exchange capacity.

References Cited by the Examiner
UNITED STATES PATENTS

| | | | |
|---|---|---|---|
| 2,761,511 | 9/56 | Billue | 260—2.5 |
| 2,797,201 | 6/57 | Veatch et al. | 260—2.5 |
| 2,916,410 | 12/59 | Frazer et al. | 260—67.6 |
| 2,996,389 | 8/61 | Fernhof et al. | 260—2.5 |
| 3,044,973 | 7/62 | Segro et al. | 260—39 |
| 3,070,572 | 12/62 | Oland et al. | 260—39 |
| 3,075,943 | 1/63 | Burgert | 260—67.6 |
| 3,093,608 | 6/63 | Vale et al. | 260—67.6 |

LEON J. BERCOVITZ, *Primary Examiner.*

UNITED STATES PATENT OFFICE
CERTIFICATE OF CORRECTION

Patent No. 3,172,867                          March 9, 1965

William E. Showalter

It is hereby certified that error appears in the above numbered patent requiring correction and that the said Letters Patent should read as corrected below.

Column 1, line 16, for "microballoons" read -- microspheres --.

Signed and sealed this 23rd day of November 1965.

(SEAL)
Attest:

ERNEST W. SWIDER
Attesting Officer

EDWARD J. BRENNER
Commissioner of Patents